US008265983B2

(12) United States Patent
Gocha, Jr.

(10) Patent No.: US 8,265,983 B2
(45) Date of Patent: Sep. 11, 2012

(54) SYSTEM FOR COLLECTING INFORMATION FOR USE IN CONDUCTING AN INTERVIEW

(76) Inventor: H. Alan Gocha, Jr., Franklin, MI (US)

( * ) Notice: Subject to any disclaimer, the term of this patent is extended or adjusted under 35 U.S.C. 154(b) by 1078 days.

(21) Appl. No.: 12/129,105

(22) Filed: May 29, 2008

(65) Prior Publication Data

US 2008/0300966 A1    Dec. 4, 2008

Related U.S. Application Data

(60) Provisional application No. 60/932,625, filed on Jun. 1, 2007, provisional application No. 60/941,566, filed on Jun. 1, 2007.

(51) Int. Cl.
*G06Q 30/00* (2012.01)
(52) U.S. Cl. ........... 705/7.32; 705/7.29; 705/7.33
(58) Field of Classification Search .......... 705/7.29, 705/7.32, 7.33
See application file for complete search history.

(56) References Cited

U.S. PATENT DOCUMENTS

| | | | |
|---|---|---|---|
| 6,895,405 B1* | 5/2005 | Choi et al. ........................ 1/1 |
| 6,993,495 B2* | 1/2006 | Smith et al. ............... 705/7.32 |
| 2002/0077888 A1* | 6/2002 | Chiang .......................... 705/12 |
| 2002/0119433 A1* | 8/2002 | Callender ...................... 434/322 |
| 2004/0128183 A1* | 7/2004 | Challey et al. ................. 705/10 |
| 2005/0075919 A1* | 4/2005 | Kim ............................... 705/10 |
| 2006/0282306 A1* | 12/2006 | Thissen-Roe ................. 705/11 |
| 2011/0076663 A1* | 3/2011 | Krallman et al. ............. 434/362 |

OTHER PUBLICATIONS

Marra and Bogue, A Critical Assessment of Online Survey Tools, Proceedings of the 2006 WEPAN Conference, 2006, p. 1-11.*
Survey Monkey Conversion Guide, May 7, 2007, p. 1-23.*

* cited by examiner

*Primary Examiner* — Justin M Pats
(74) *Attorney, Agent, or Firm* — Oakland Law Group, PLLC

(57) ABSTRACT

One embodiment relates to a method or process for structuring and operating an integrated interviewing and capture process including providing a produced recording of the interview. In one embodiment, the process includes collecting data from the subject, customizing the interview questions, managing employee availability and selecting an interviewer, conducting the interview, capturing the interview in a recorded format, editing the captured interview, producing a recording of the edited interview, soliciting and collecting feedback and revising the interview questions. In one embodiment, the process includes an integrated interviewing, capture and delivery process for operating an entire interviewing business in a highly efficient and cost effective manner.

5 Claims, 5 Drawing Sheets

SYSTEM FOR COLLECTING INFORMATION FOR USE IN CONDUCTING AN INTERVIEW

CROSS-REFERENCE TO RELATED APPLICATION

This application claims the benefit of U.S. provisional applications 60/932,625, filed Jun. 1, 2007 and 60/941,566, filed Jun. 1, 2007, which are incorporated by reference herein.

BACKGROUND

1. Technical Field

One embodiment of the present invention is directed to an interviewing and capture process.

2. Background Art

It is generally known to conduct interviews. It is also generally known to do research prior to conducting an interview. However, one of the challenges in conducting many interviews is being able to customize the questions quickly so that only relevant questions are asked, and to be able to cover those questions in a fixed amount of time. Traditionally, most interviews start with a general set of questions in mind, and go for as long as it takes to get the information they need. This means that there are wide swings in the amount of time each interview takes, and unless the customer is willing to go with an hourly pay-as-you-go approach, this approach does not work very well as a business model. If one uses a fixed fee arrangement, the base price would have to be high enough to take into account the wide range of time it could take, and the price may be too high.

SUMMARY

One embodiment relates to a method or process for structuring and operating an integrated interviewing and capture process including providing a produced recording of the interview. In one embodiment, the process includes collecting data from the subject, customizing the interview questions, managing employee availability and selecting an interviewer, conducting the interview, capturing the interview in a recorded format, editing the captured interview, producing a recording of the edited interview, soliciting and collecting feedback and revising the interview questions. In one embodiment, the process includes an integrated interviewing, capture and delivery process for operating an entire interviewing business in a highly efficient and cost effective manner.

In one embodiment, the process limits the amount of time required by each interviewee to be interviewed. In the one embodiment, based upon input from the interviewer and third parties obtained using questionnaires or other data collection, the interview topics are then weighted based upon the responses and the number of questions to be asked regarding each topic is determined. Further, in one embodiment, the questions for the interview may be manually customized, but this is significantly limited since the process allows the questions to be customized quickly and consistently.

In one embodiment, a system for collecting information for use in conducting an interview of an interviewee by an interviewer is disclosed. The system includes a computer readable medium configured to: transmit a first questionnaire to obtain information relating to an interviewee from the interviewee, the first questionnaire including a number of questions; receive information relating to the interviewee in response to the number of questions included on the first questionnaire, wherein the information received in response to the number of questions included on the first questionnaire includes a number of interviewee topics and the information received in response to the number of questions included on the second questionnaire includes a number of third party topics; transmit a second questionnaire to obtain information relating to the interviewee from a third party, the second questionnaire including a number of questions; receive information relating to the interviewee in response to the number of questions included on the second questionnaire; generate a number of interview topics and a number of interview questions for each of the number of interview topics based on the information received in response to the number of questions included on the first and second questionnaires; weight the number of interviewee topics and the number of third party topics to obtain a number of weighted topic scores; and generate the number of interview topics and the number of interview questions for each of the number of interview topics based on the number of weighted topic scores.

DETAILED DESCRIPTION OF EMBODIMENTS

Figure 1:
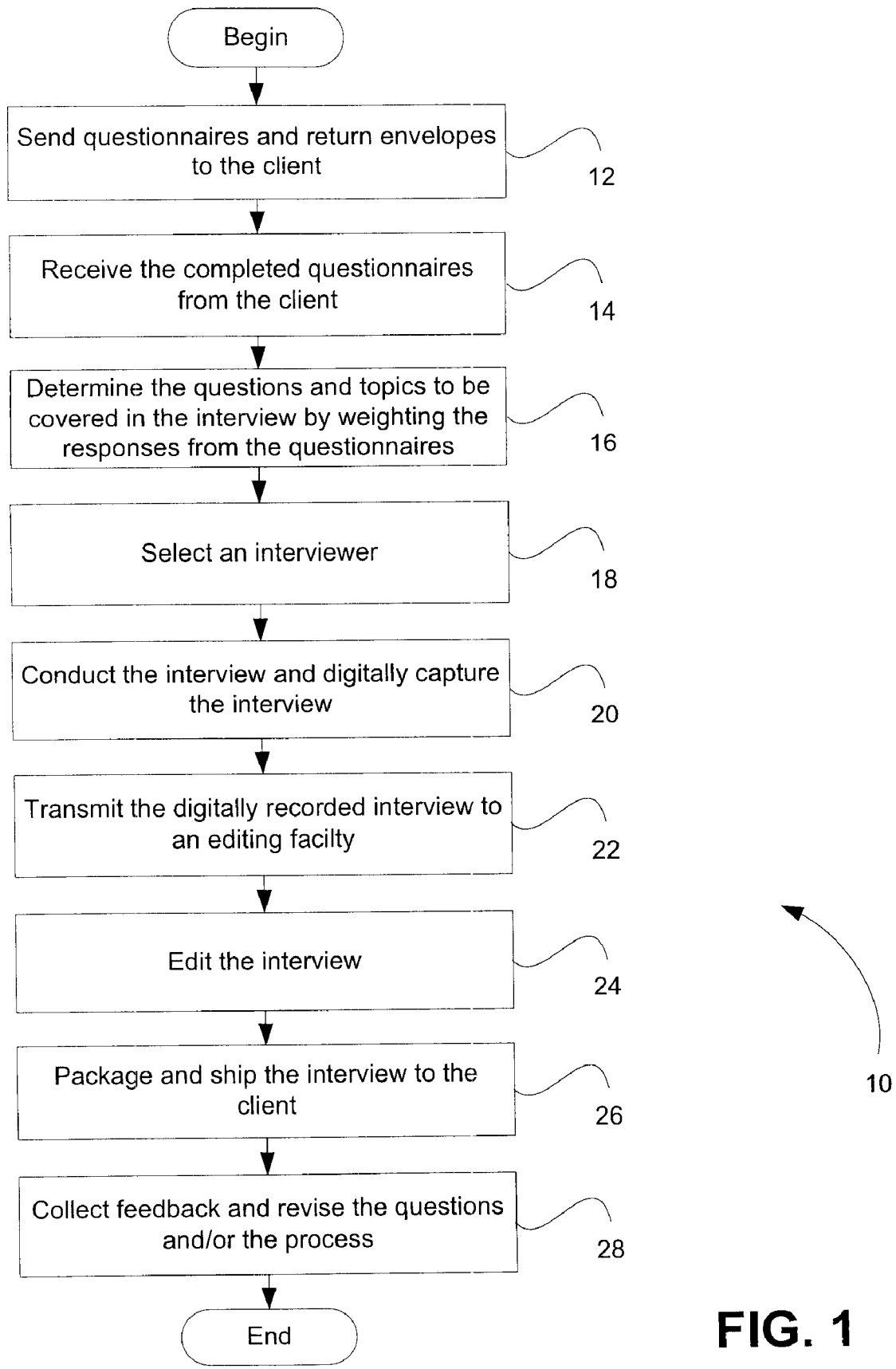
FIG. 1 is a flow chart block of an interviewing process according to an exemplary embodiment.

Referring to FIG. 1, one embodiment relates to a method or process as generally depicted by flowchart 10, of collecting data, customizing interview questions, managing employee availability and selecting interviewer, conducting interview, digitally capturing the interview, transmitting the captured interview, editing the captured interview, producing a DVD or other digital media of the edited interview, collecting feedback and revising the interview questions.

The interview process begins at any appropriate time but typically after a customer requests an interview such as by phone or online and a sale occurs. As generally depicted by block 12, a first questionnaire, a second questionnaire, and return envelopes are sent to the client prior to the interview or may alternatively be provided just prior thereto. The first and second questionnaires may also be sent and returned electronically or may alternatively be taken in an interactive format, such as by conducing a phone call or online. It is considered particularly advantageous to have the questionnaires in a written form, either on paper or electronically.

The first questionnaire (e.g., Interviewee Questionnaire, IQ, etc.) is particularly configured to obtain relevant life experiences of the interviewee, including specifically, at least, education, career, family background (including parents' personality information) and ancestry and general interests; specific information about the interviewee's at least three biggest accomplishments, three most exciting things that they have done or seen, and three things that changed their life the most. The process may also provide an option for the interviewee to suggest general categories of topics they would like to be covered in the interview; to allow the interviewee to provide specific questions they would like to be asked; to allow the interviewee to specify topics to avoid; to obtain marketing information; to give the interviewee an opportunity to provide immediate feedback for improving the first questionnaire; and educate the interviewee about the process. Appendix 1 includes an exemplary embodiment of an interviewee questionnaire.

The second questionnaire (e.g., Friends and Family Questionnaire, FFQ, etc.) is particularly configured to allow a third party, typically in the form of friends and family, or any other identified class of individuals as the likely audience of the finished product (in addition to being representatives of future generations that may watch the video), to suggest general and/or specific categories of topics they would like the interviewer to ask about the interview; to allow them to provide general and/or specific questions for the interviewer to ask the interviewee; and to allow the third party to specify topics to avoid; to obtain marketing information; to give the friends and family members an opportunity to provide immediate feedback for improving the first questionnaire; and to provide the interviewer with information that can be used to educate and comfort the interviewee about the process. Appendix 2 includes an exemplary embodiment of a friends and family questionnaire.

One feature of this process is that by combining the questionnaire and certain information about the process in one document, it greatly reduces the amount of paper an interviewee has to read and makes reading the information more interesting (and therefore more likely they will read it) because it is part of filling out the questionnaire and telling information about themselves. Combining the questionnaire with certain information about the process reduces costs and increases efficiency and effectiveness of the process.

The particular process may be made scalable depending upon the particular focus and investment opportunity for the interviewee. If more than one person is going to be interviewed (such as a couple), two IQs (one for each person) are sent. According to one exemplary embodiment (e.g., with a lower-priced package), one FFQ is sent to the client and the third parties, such as a family or group of individuals, as they may choose one person to fill it out or the family may aggregate the responses of the family members and put the combined responses on the one questionnaire. According to another exemplary embodiment (e.g., with a higher-priced package), multiple copies of the FFQ are sent to the family and all of their responses will be included later in the process. The process limits the amount of time required to complete the interview process for each interview by weighting the topics and thereby determining the number of questions that should be asked regarding each topic.

In block 14 of FIG. 1, the completed questionnaires are received from the interviewer and/or third party. After the IQ(s) and the FFQ(s) are returned by the party filling them out, a weighting system is applied to each response. The relevance of certain topics and questions is determined using a mathematical weighting system, and the number of questions to ask about the topic is chosen using a mathematical formula that takes into consideration how long the interview is supposed to be (e.g., if the client bought a one hour package, the number of questions that can typically be asked and answered in an hour is known within a range) (block 16 of FIG. 1).

Figure 2:
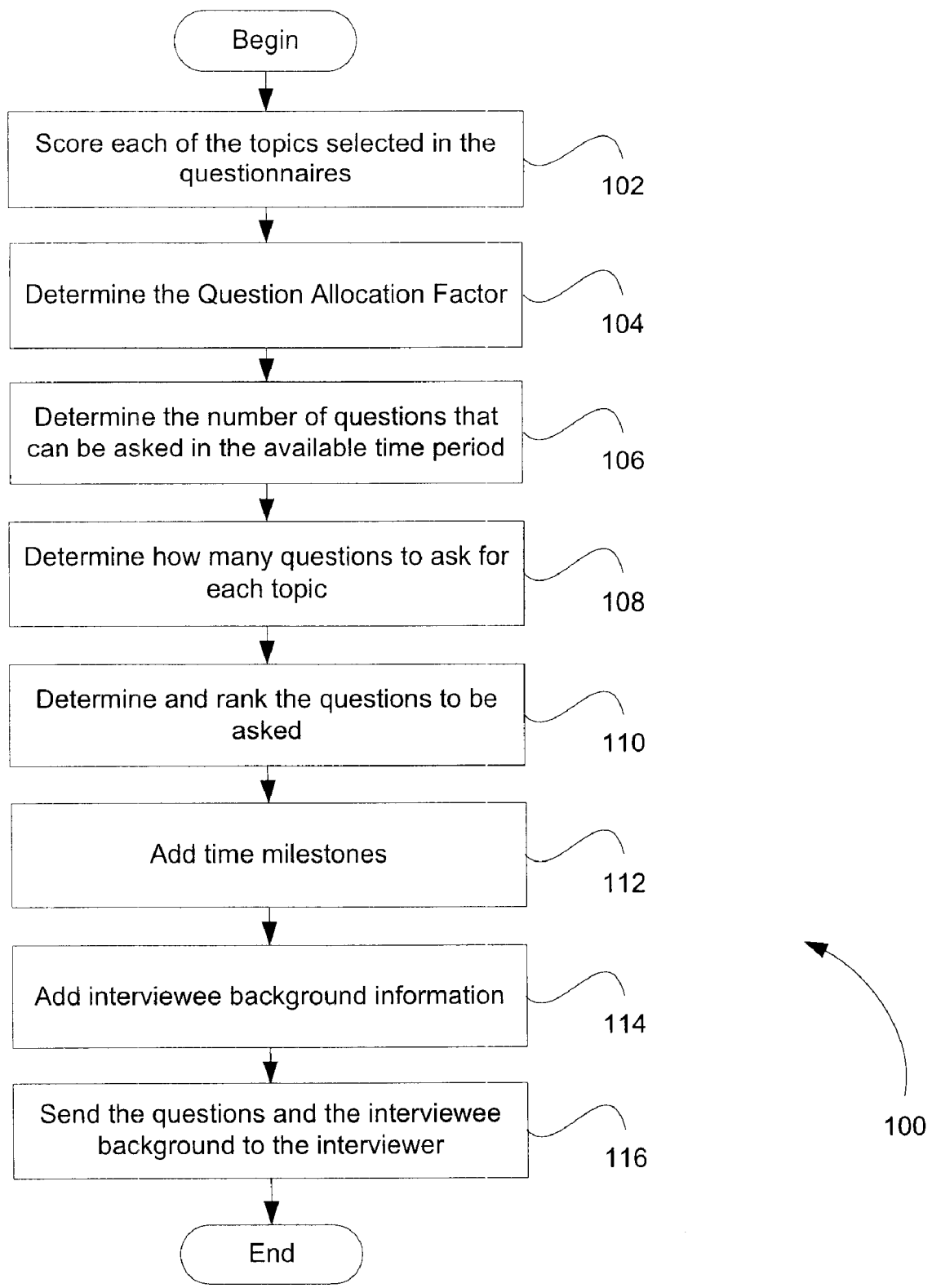
FIG. 2 is a flow chart of a process for selecting topics and questions for an interview according to an exemplary embodiment.

Referring to FIG. 2 and according to one exemplary embodiment, the weighting and assembling process as generally depicted by flowchart 100, includes scoring each of the topics selected by the respondents in the questionnaires (block 102), using the scores for each topic to determine the question allocation factor (block 104), determining the number of questions to be asked during the interview (block 106), determining the number of questions to be asked for each topic (block 108), determining and ranking the questions to be asked (block 110), setting time milestones to facilitate keeping the interview on schedule (block 112), adding a summary of the interviewee's background (block 114), and sending the summary and questions to the interviewer (block 116).

First, each of the topics selected by the interviewee on the IQ and by the friends and family of the interviewee on the FFQ are given a score (e.g., the Weighted Topic Score) using equation (1):

$$\text{Weighted Topic Score} = \text{Inherent Interest Value} + \text{Overlap Value} + \text{Reference Value} - \text{Saturation Value} \quad (1)$$

The Inherent Interest Value is a value that is assigned to each topic based on experience and feedback from prior interviews. This value changes periodically as data is collected and applied. Some topics simply provide for a more interesting interview and receive a better response than other topics. The Overlap Value is an adjustment given to topics that are selected by both the interviewee on the IQ and their friends and family on the FFQ to reflect the mutual interest in the topic and the likelihood that they have some awareness of an interesting story that the interviewee can tell about the topic. The Reference Value is another adjustment given to topics that are specifically noted in the written portion of the questionnaires or for which specific questions are suggested in the questionnaires. The Saturation Value compensates for multiple topics of a similar nature that are selected in the questionnaires. While the wishes of the participants are followed as closely as possible, an interview that is too narrowly focused tends to be less interesting and may not provide as good of a cross section of information to future audiences.

The Weighted Topic Score for each selected topic is divided by the total Weighted Topic Scores for all of the selected topics to determine a "Question Allocation Factor" as shown in equation (2):

$$\frac{\text{Weighted Topic Score}}{\text{Total Weighted Topic Scores}} = \text{Question Allocation Factor} \quad (2)$$

The time that is allocated to the interview for that interviewee (for example, 60 minutes for a single person being interviewed, or 20 minutes for one person that will be interviewed as part of an hour long couple interview) is multiplied by the "Average Questions per Minute Constant" which is a constant derived and modified based on experience from prior interviews. The product is called the "Total Available Questions" as shown in equation 3:

$$\text{Average Questions per Minute Constant} \times \text{minutes allocated to interview} = \text{Total Available Questions} \quad (3)$$

The total Available Questions figure is multiplied by the Question Allocation Factor for each topic. The product is called the "Topic Allocation" as shown in equation 4:

$$\text{Topic Allocation} = \text{Total Available Questions} \times \text{Question Allocation Factor} \quad (4)$$

The number of questions specified by the Topic Allocation for each topic are pulled from the existing question bank and are assembled in a particular order. Each questions in the question bank is ranked from highest to lowest based on experience feedback. The rankings are adjusted periodically. For example, if the Topic Allocation calls for 16 questions for a particular topic, the top 16 questions will be used for that topic. Any questions submitted by the person filling out an IQ or FFQ are added to the question bank.

Time milestones are added to the series of questions so that the interviewer can keep the interview on schedule and be sure they do not spend too much time on any particular topic. The interviewer may cut off the questions for a topic if necessary to stay on track and have the best chance to cover all of the selected topics. Ranking the questions within each topic as described above allows the more important questions to be asked and the less important questions to be "at risk" for being cut off if necessary to stay on track in terms of time.

The interviewee's background information is added in summary form to the beginning of the customized list of questions for that interview using a special code to give the interviewer a quick reference and key facts about the interviewee. In most cases, the interviewer will not have processed the questionnaires and will not know anything about the interviewee. So in less than 5 minutes, the interviewer can learn all they need to know about the interviewee and can look back at the summary during the interview if necessary. This significantly reduces the preparation time for each interviewer and significantly increases their efficiency. The questions (including the background summary) are sent to the interviewer several days before the scheduled interview for the interviewer to review.

Figure 3:
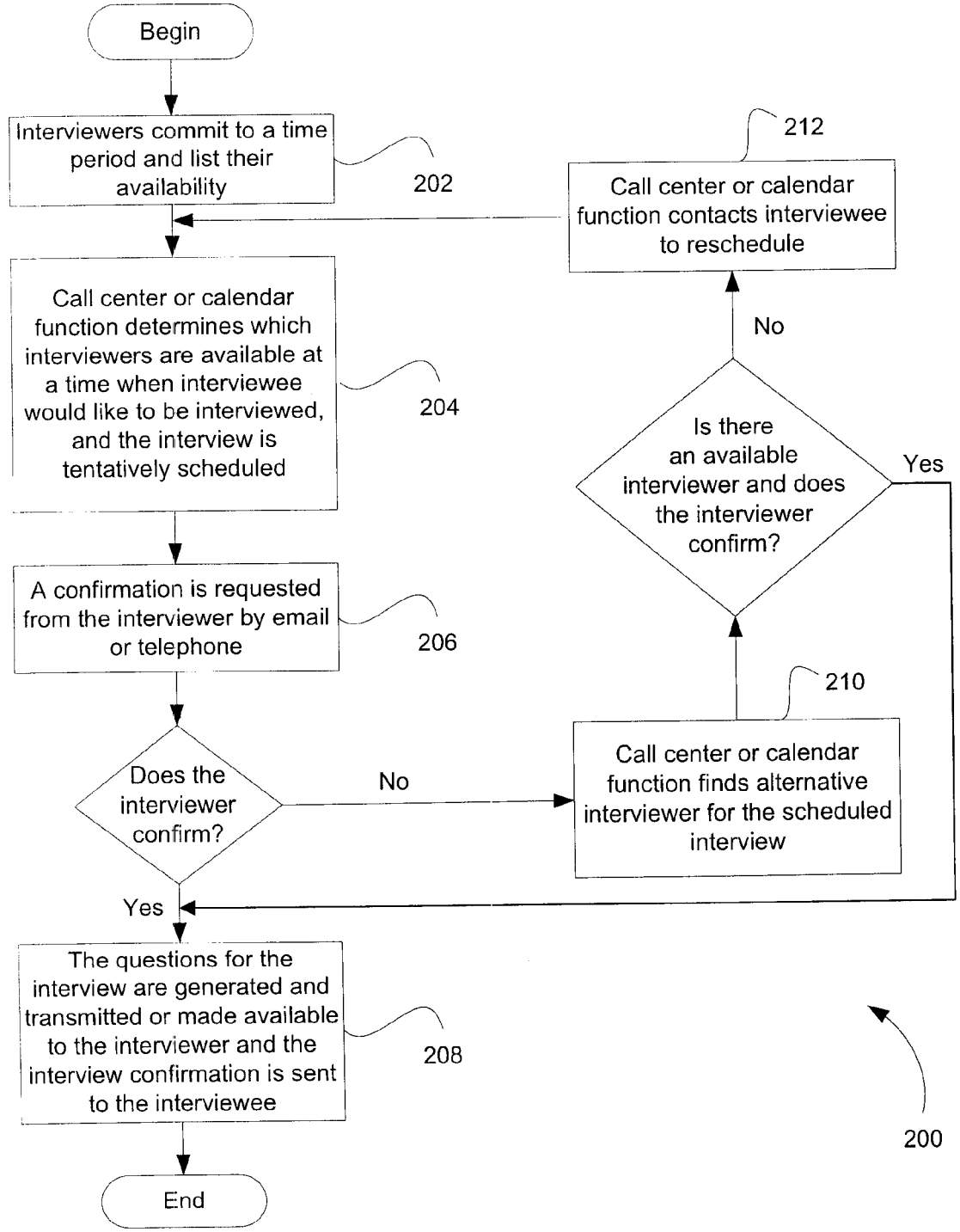
FIG. 3 is a flow chart of a process for selecting an interviewer for an interview according to an exemplary embodiment.

According to block 18 of FIG. 1, an interviewer is selected. Referring now to FIG. 3, a process for choosing an interviewer is shown according to an exemplary embodiment, as generally depicted by flowchart 200. The interviewer is chosen from a pool of prospective interviewers. The interviewers are given flexibility in the amount of hours they work and when they work those hours to help attract and retain good interviewers. All of the scheduling of the employees at various locations may be managed from a central location to be more effective. In one embodiment, each interviewer commits to be available for interviews a certain number of hours each week (block 202). The number of hours will vary by location. The employees list their availability for the coming weeks on a private website or by calling in their availability. When a customer calls the call center or an automated calendar function checks to schedule an interview or books an interview online, the call center looks at the website and determines who is available and at what times for the dates the caller is interested in (block 204).

When a customer seeks to schedule an interview, the call center or automated calendar function determines which interviewers are available at what times and tentatively schedules the interview. The call center or automated calendar function then electronically contacts the interviewer or places a call to confirm that the interviewer is still available (block 206). Upon confirmation, the interview is scheduled with the interviewer and a confirmation is sent to the interviewee (or their designee) either electronically or by phone (block 208). If there is no confirmation with the interviewer, an alternative interviewer is sought (block 210). If an interviewer for that time is not found and confirmed, the call center or calendar function contacts the interviewee (or their designee) and the interview is reschedule (with the confirmation process then being repeated) (block 212). Once the interview is scheduled and confirmed by the interviewer and confirmation is sent to the interviewee, the questions and summary are generated and sent electronically or in hard copy to the interviewer or made available for download by the interviewer (block 208).

According to one exemplary embodiment, each interviewer records a message in their voice at the call center and/or the website. A prospective customer may listen to the various messages of the interviewer's voices and request a particular interviewer.

Figure 4:
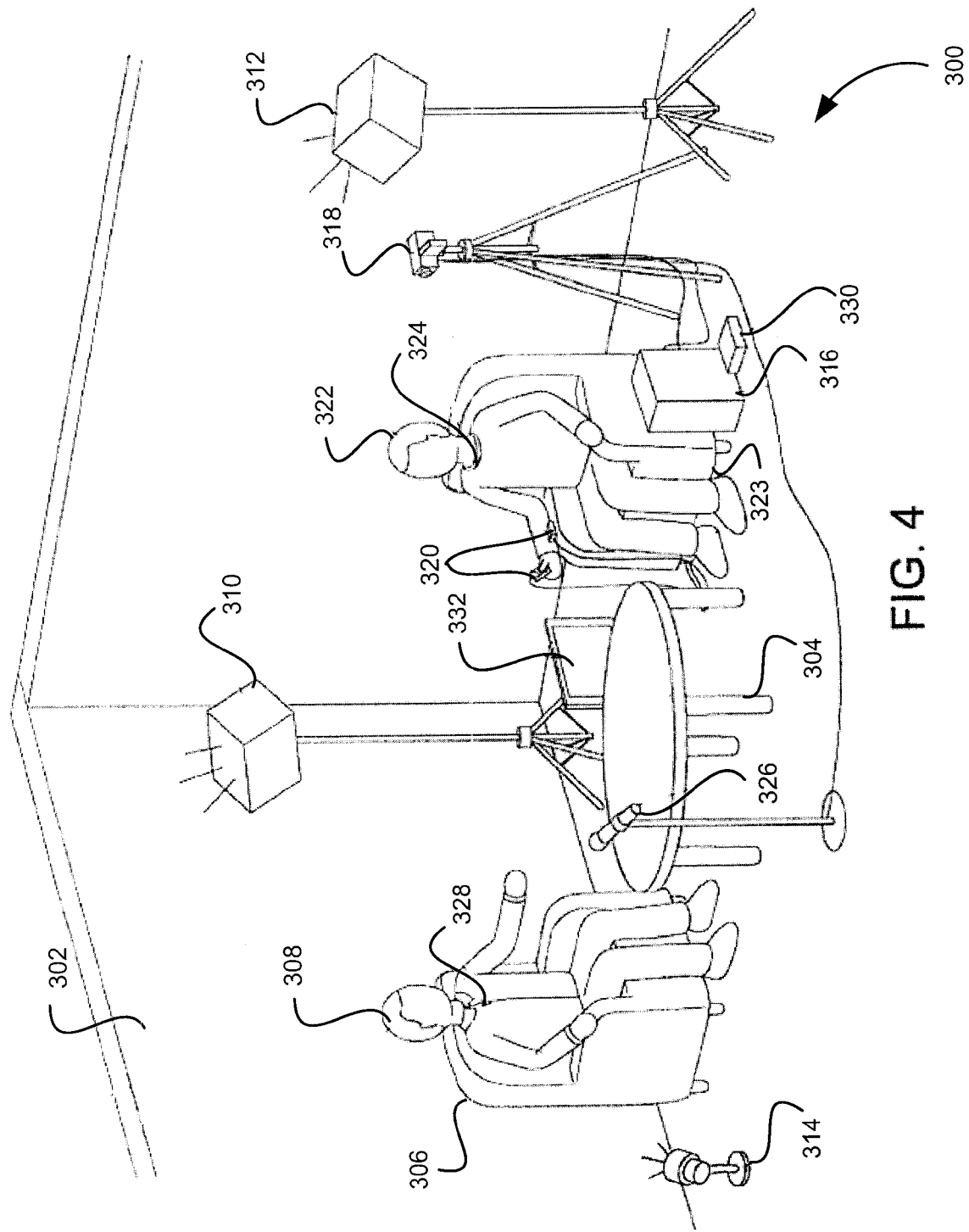
FIG. 4 is an isometric view of an interviewing facility according to an exemplary embodiment.

The process for conducting the interview involves several parts. In a first part a physical layout 300 of the facility is shown according to one exemplary embodiment in FIG. 4. The facility is designed to create a comfortable environment, much like a living room, so that the person being interviewed will be more likely to relax. A background wall 302 is designed to provide a consistent background that is appropriate for a wide range of interviews and will not be distracting to the interviewee. The physical layout may include a multitude of other objects such as artwork, furniture, or plants that are not shown on camera but are provided to make the interviewee feel more comfortable. A table 304, provided near the interviewee, may include tissues or other items for the interviewee. While the exemplary embodiment shown in FIG. 4 illustrates seating 306 for only one interviewee 308. Additional seating may be included for multiple interviewees or as additional decoration to make the interviewee feel more comfortable.

The lighting for the facility is all fluorescent lighting that is configured to provide three-point lighting. In at least one embodiment, fluorescent lighting is used instead of incandescent, halogen, or other lighting. The fluorescent lighting is specialized to provide truer color and to be consistent over long periods of time. The fluorescent lighting further does not significantly raise the temperature of the room more than a few degrees over the course of a day. Indirect reflection of the fluorescent lighting is used so that the person being interviewed doesn't feel like they are being interrogated or in the spotlight, yet are consistently highlighted. The locations for each of the lights, chairs, interviewee(s), interviewer, camera and equipment are prearranged to provide greater function and make the interviewee feel more comfortable. According to one exemplary embodiment, a first fluorescent light source 310 is reflected off the ceiling to light the interviewee from above, a second fluorescent light source 312 is reflected off a wall to light the interviewee from the side and front, and a third fluorescent light source 314 is reflected off the wall behind the interviewee to provide backlighting. According to other exemplary embodiments, more or fewer light sources may be provided and may be arranged differently to light the interviewee.

The facility also includes a computer 316 and camera system 318 that allows the interviewer to conduct the interview and run the camera. The interviewer simultaneously runs the camera and conducts the interview. This reduces costs considerably and also allows the interviewee to relax more because there are fewer strangers in the room (only one, the interviewer). The system allows the interviewer to sit comfortably in a chair across from the interviewee(s) so the interviewer doesn't have to stand behind a camera.

Many known video cameras come with a wireless remote, but in order to use it, the interviewer must be standing in front of the camera and point the remote at the camera—a configuration that does not work in this setting. Therefore, in the current process a wired remote control 320 is used by the interviewer 322 in a seat 323. According to one exemplary embodiment, the interviewer can run the camera using two wired remote controls. A first wired remote control controls the camera zoom. The second wired remote control controls the left-right and up-down panning of the camera using a pan assembly and motor. The wired remotes provided with many cameras may be short (e.g., less than 1 foot in length) because they are configured to be used by a user behind the camera for those instances where the camera is mounted on a tripod and the user wants to zoom in, out, etc. without bumping or vibrating the camera. Therefore, an extension may be provided so that a person sitting next to the camera (the interviewer), can operate the zoom functions remotely.

The camera system further includes wired microphones 324, 326 and 328 for all recording in order to reduce and/or eliminate the auditory interference. A series of mixers and adapters are provided and each cord is color coded with a zip tie or otherwise marked to keep track and determine the location of each cord. While a boom-type microphone is mounted to a stand as best shown in FIG. 4, according to other exemplary embodiments, the microphone may be small lapel microphones or any other suitable device or devices for recording the voices of the interviewer and the interviewee.

The camera is connected to the computer (e.g., with an IEEE 1394 connection), which runs software designed to allow direct recording of digital video onto a hard drive 330 or to a server over a communication connection such as the internet or an intranet. The hard drive in the computer is used solely for running the software (both operating system and recording software) and is bypassed for purposes of capturing and storing the digital video. With this system, the digital video is recorded directly onto a portable hard drive, remote server, or other device using the computer as a processor (and not for storage). According to one exemplary embodiment, the video camera is a digital video camera that records video on a digital video cassette or directly to a computer. According to other exemplary embodiments, the video camera may be an analog video camera and record the interview on analog media.

While the interview is being conducted, the interviewer can watch a monitor 332 such as a flat-panel monitor that is attached to the computer and see how the person being interviewed looks (the position and alignment of the camera angle, the lighting, the sound, etc.), and can make adjustments as necessary. Since what is being seen on the monitor is a digital reproduction of what is being put on the portable hard drive or remote server or other device, what is seen on the monitor is a much more accurate representation of the footage as it is being captured. The monitor is located such that the image displayed on the monitor can only be seen by the interviewer to avoid distracting the interviewee(s). According to an exemplary embodiment, the interviewer is not seen on camera, only the interviewee(s). The interviewer's voice can be heard, but the interviewer is not seen. This keeps the focus on the interviewee, and provides the maximum screen time for the interviewee. It also eliminates the risk of comparison between the interviewee and the interviewer by a viewer of the video.

According to block 20 of FIG. 1, an interview is conducted, which is digitally captured. The interview process is conducted following fairly strict procedures. The creation and naming of the files and folders and the opening and closing of files and folders follows predetermined guidelines. A checklist is provided that is configured to make sure the room is set up properly and the equipment is connected and running properly, and for asking the interview questions.

According to block 22 of FIG. 1, the digitally recorded interview is transmitted to an editing facility. After the interview is over, the portable hard drive or other portable storage device may be shipped to a central location or the central location can access the digital footage from the server for processing the raw footage and editing it to create a DVD or other digital media. This allows a particular business location to scale quickly since all of the editing can be done somewhere else, thus avoiding redundant systems. The portable hard drive is selected to withstand being transported or shipped. By using portable hard drives or other portable storage device to store the digital video, the computer system can be used continuously, since when one drive is full it is simple to plug in another one. According to other exemplary embodiments, the video may be transferred to a central editing location by another method (e.g., a memory stick, electronic file transfer, via any appropriate communication connection such as the internet, etc.).

Figure 5:
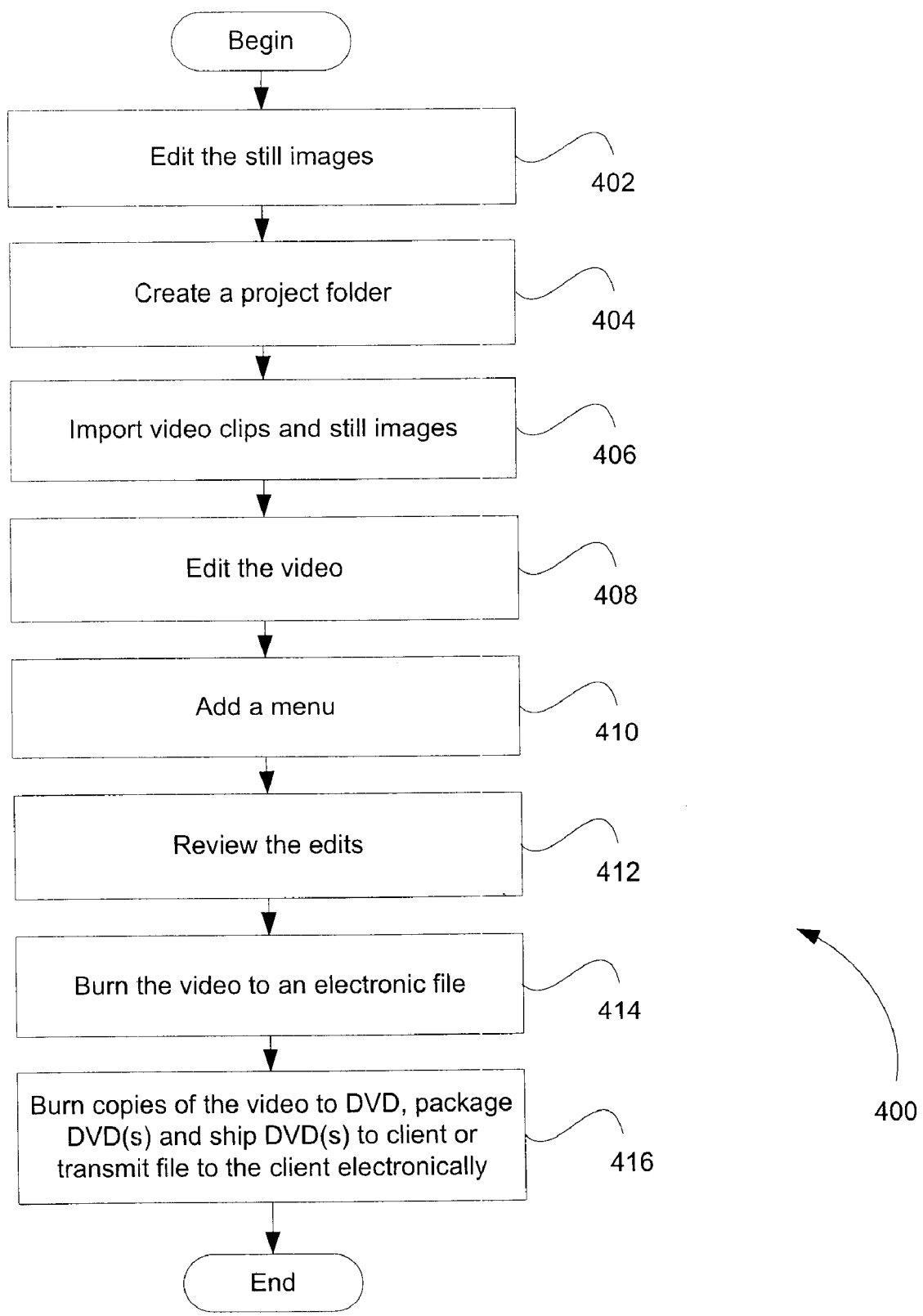
FIG. 5 is a flow chart of a process for editing an interview according to an exemplary embodiment.

According to block 24 of FIG. 1, the interview is edited. Referring now to FIG. 5, an editing process is shown according to an exemplary embodiment, as generally depicted by flowchart 400. All editing is done from one or more central locations. Editing can be a time consuming process and editing all the videos in one central location can help to make the process more efficient. The editors are divided into regions so that they can become familiar with the speaking habits of the interviewers in that region and further improve the efficiency of the editing process. The editing computers are configured to include two initial hard drives. A first hard drive is configured to run the operating system and editing software, and the second hard drive is configured to store the project files (including the large burn files). The source video is left on the portable hard drive, the flash drive or other digital media capturing device or server and it is read from there when needed. This editing system keeps the software running at top speed uninterrupted while writing the project files uninterrupted. The selected system reduces the burn and editing time significantly because the source video doesn't get transferred from the portable hard drive. According to other exemplary embodiments, the editing can be accomplished through networked computers that read the source video from the portable hard drive, flash drive or other digital media capturing device or server.

Still images (e.g., photographs) may be included in the videos. Many times, the photos need to be cleaned up (edited) to remove damage from aging or mishandling. The photos may be edited by the same person editing the video or may be edited by a second person. Separating the editing tasks improves the efficiency of the editing process.

For consistency, the editors are required to follow guidelines and procedures for editing the still images and the video. Checklists are provided and must be completed, and manuals are provided including details about how and when to edit and how to use the editing software. The manuals take the editor step-by-step through the process and procedures of editing. The manuals further include procedures for setting up files and folders, how to name the files and folders, etc. to improve efficiency and consistency.

In block 404, a still image project folder is created. The still images are edited as necessary so that they are ready to use. A project folder for the video is created (block 404). The video clips are imported from the portable hard drive, flash drive or other digital media capturing device or server, the still images are imported from the still image project folder (block 406) and the video is edited (block 408). A menu is added to allow the client to navigate the finished product (block 410). The edits are reviewed (block 412). Once the edited videos and images are acceptable, a label is printed on the DVDs. The edited video and images are burned to an electronic file (block 414), and then as many copies from the electronic file as the customer requested are burned onto individual DVDs (block 416). The finished DVDs are placed in jewel boxes and shipped to the customer (block 416). According to other exemplary embodiments, the edited video and images may be transmitted to the client electronically or by another digital medium or made available electronically such as for downloading on a website (block 26 of FIG. 1).

According to block 28 of FIG. 1, feedback is collected and the feedback may be used to revise the questions and/or the process. Feedback is obtained from the customer, including the interviewee(s) and their friends. Feedback forms are sent along with a self-addressed, postage-paid return envelope to the customer. The feedback form may also be sent and returned electronically. The feedback helps with ranking the questions to reflect how the audience feels after they have seen the video. Often, what the interviewee and the friends and family request in the FFQ and what they end up really enjoying can be quite different. The feedback forms capture that information and allow the chance to adjust and revise questions, timing, techniques, packages and everything that goes into the product. The feedback also provides an opportunity to add questions that were not asked, and those questions are added to the question bank. Appendix 3 is an exemplary embodiment of an interviewee feedback form. Appendix 4 is an exemplary embodiment of a friends and family feedback form.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for collecting information for use in conducting an interview of an interviewee by an interviewer, the system comprising
    a non-transitory computer readable medium configured to:
        transmit a first questionnaire to obtain information relating to an interviewee from the interviewee, the first questionnaire including a number of questions;
        receive information relating to the interviewee in response to the number of questions included on the first questionnaire, wherein the information received in response to the number of questions included on the first questionnaire includes a number of interviewee topics and the information received in response to the number of questions included on the second questionnaire includes a number of third party topics;
        transmit a second questionnaire to obtain information relating to the interviewee from a third party, the second questionnaire including a number of questions;
        receive information relating to the interviewee in response to the number of questions included on the second questionnaire;
        generate a number of interview topics and a number of interview questions for each of the number of interview topics based on the information received in response to the number of questions included on the first and second questionnaires;
        weight the number of interviewee topics and the number of third party topics to obtain a number of weighted topic scores;
        generate the number of interview topics and the number of interview questions for each of the number of interview topics based on the number of weighted topic scores;
        determine a question allocation factor for each of the number of interviewee topics and the number of third party topics based on the number of weighted topic scores;
        determine the number of interview questions for each of the number of interview topics based on the question allocation factors for each of the number of interviewee topics and the number of third party topics; and
        determine a time milestone schedule for the number of interview topics based on the question allocation factors for each of the number of interviewee topics and the number of third party topics and the total interview time.

2. The system of claim 1, wherein weighting the number of interviewee topics and the number of third party topics to obtain a number of weighted topic scores includes comparing the number of interviewee topics with the number of third party topics to obtain the number of weighted topics.

3. The system of claim 1, wherein the computer readable medium is additionally configured to rank the number of questions for each of the number of interview topics based on the information received in response to the number of questions included on the first and second questionnaires.

4. The system of claim 1, wherein the computer readable medium is additionally configured to output the number of interview topics and the number of ranked questions for each of the number of interview topics to an interview report for use by the interviewer during the interview.

5. The system of claim 4, wherein the computer readable medium is additionally configured to output background information of the interviewee to the interview report for use by the interviewer during the interview.

* * * * *